United States Patent [19]
Chen

[11] Patent Number: 5,618,124
[45] Date of Patent: Apr. 8, 1997

[54] UNIVERSAL WIPER ARM CONNECTOR

[76] Inventor: Liang-Yuan Chen, P.O. Box 82-144, Taipei, Taiwan

[21] Appl. No.: 646,095

[22] Filed: May 7, 1996

[51] Int. Cl.⁶ .................................................. B60S 1/40
[52] U.S. Cl. .............. 403/3; 403/329; 403/263; 403/237; 15/250.32; 15/250.31
[58] Field of Search ............. 15/250.32, 250.31, 15/250.44, 250.46, 250.33; 403/326, 327, 329, 263, 154, 155, 161, 3, 4, 237

[56] References Cited

U.S. PATENT DOCUMENTS 5,383,248  1/1995  Ho ........................................ 15/250.32

FOREIGN PATENT DOCUMENTS

| 329515  | 8/1989 | European Pat. Off. | ............ 15/250.32 |
|---------|--------|---------------------|----------------------|
| 598653  | 5/1994 | European Pat. Off. | ............ 15/250.32 |
| 2501135 | 9/1982 | France              | ............ 15/250.32 |
| 2306218 | 8/1973 | Germany             | ............ 15/250.32 |
| 2943288 | 5/1981 | Germany             | ............ 15/250.32 |
| 3608936 | 5/1987 | Germany             | ............ 15/250.32 |

*Primary Examiner*—Gary K. Graham
*Attorney, Agent, or Firm*—Alfred Lei

[57] ABSTRACT

A universal wiper arm connector including a U-shaped body having an upper arm formed with two flanges, two shoulders, a first and second tongues having a protuberance thereon, a lower arm provided with a third tongue having a protuberance thereon, and an axle perpendicular to the U-shaped body, whereby the universal wiper arm connector can be slid into a U-shaped end of wiper arms of different sizes.

3 Claims, 4 Drawing Sheets

5,618,124

UNIVERSAL WIPER ARM CONNECTOR

BACKGROUND OF THE INVENTION

1. Field of the Invention

This invention is related to an improved universal wiper arm connector.

2. Description of the Prior Art

It has been found that the conventional wiper arms on the marketplace are of different sizes so that it is necessary to use a particular connector to connect a wiper arm with a windshield wiper. Hence, once a wiper arm connector is not working or does not work properly, the user must go to find a particular wiper arm connector for a certain kind of wiper arm thus causing much inconvenience. Furthermore, it is common for a user to spend a lot of time trying to find the particular connector. Quite often, the user simply replaces the entire wiper arm with a new one because the appropriate connector cannot be located, thereby wasting both time and money.

Therefore, it is an object of the present invention to provide an improved wiper arm connector which can obviate and mitigate the above-mentioned drawbacks.

SUMMARY OF THE INVENTION

This invention relates to a universal wiper arm connector.

It is the primary object of the present invention to provide a universal wiper arm connector which can be easily connected with wiper arms of different sizes.

It is another object of the present invention to provide a universal wiper arm connector which is simple in construction.

It is still another object of the present invention to provide a universal wiper arm connector which is low in cost.

It is still another object of the present invention to provide a universal wiper arm connector which is convenient and reliable in use.

It is a further object of the present invention to provide a universal wiper arm connector which has a prolonged service life.

Other objects of the invention will in part be obvious and in part hereinafter pointed out.

The invention accordingly consists of features of constructions and method, combination of elements, arrangement of parts and steps of the method which will be exemplified in the constructions and method hereinafter disclosed, the scope of the application of which will be indicated in the claims following.

DETAILED DESCRIPTION OF THE PREFERRED EMBODIMENT

Figure 1:
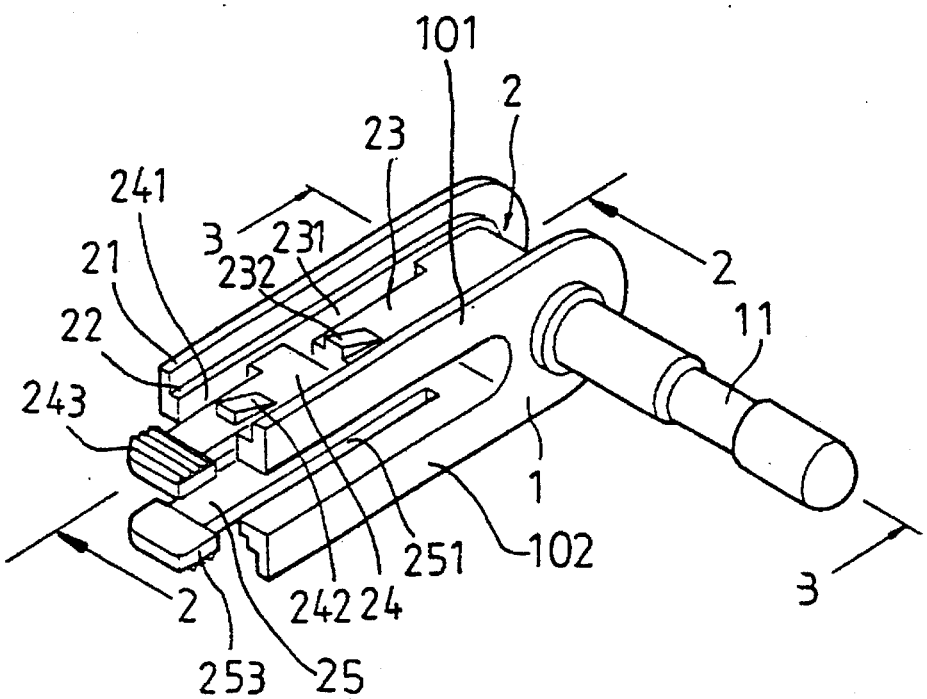
FIG. 1 is a perspective view of the present invention.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

Figure 2:
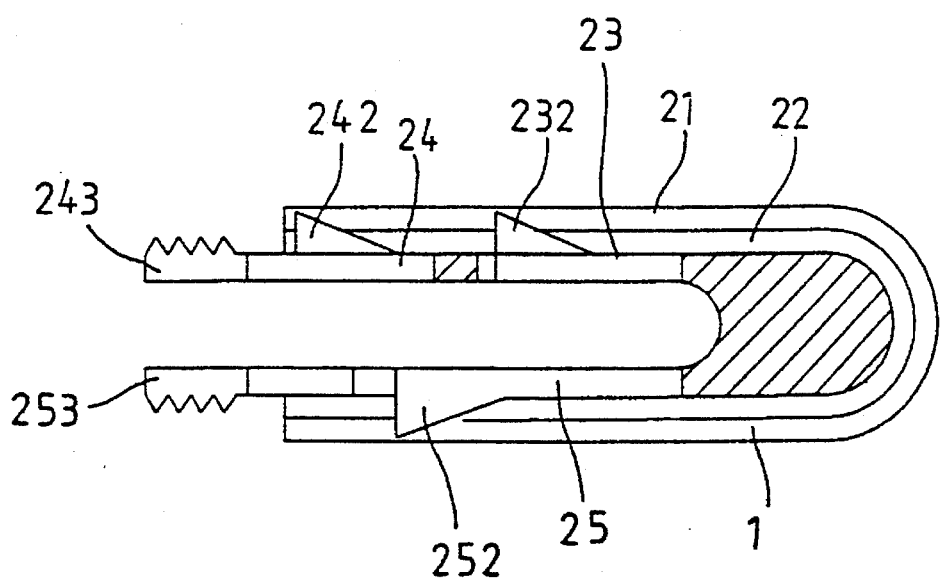
FIG. 2 is a sectional view taken along line 2—2 of FIG. 1.

With reference to the drawings and in particular to FIGS. 1 and 2 thereof, the windshield wiper connector according to the present invention comprises a generally U-shaped body 1 and an axle 11 perpendicular to the U-shaped body 1. The U-shaped body 1 has an upper arm 101 and a lower arm 102. The upper arm 101 and the lower arm 102 are each formed with two flanges 21 one at a side thereof. The inner side of the flange 21 is formed with a shoulder 22.

The upper arm 101 is provided with a first tongue 23 and a second tongue 24 between the shoulders 22. The first tongue 23 and the second tongue 24 lie on the same plane and are lower than the shoulders 22 in position. There is a groove between front end of the first tongue 23 and the rear end of the second tongue 24. There is a groove at both sides of the front portion of the first tongue 23 thereby providing the front portion of the first tongue 23 with resiliency. The front portion of the first tongue 23 has a wedge-like protuberance 232 thereon. There is a groove at both sides of the front portion of the second tongue 24 thereby providing the front portion of the second tongue 24 with resiliency. The front portion of the second tongue 24 has a wedge-like protuberance 242 in the intermediate position of its upper side and a handle 243 at the free end of the upper side.

The lower arm 102 is provided with a third tongue 25 having a bottom side higher than the shoulder 22 of the lower arm 102. There is a groove at both sides of the front portion of the third tongue 25 thereby providing the front portion of the third tongue 25 with resiliency. The front portion of the third tongue 25 has a wedge-like protuberance 252 at the intermediate position of the bottom side and a handle 253 at the free end of the bottom side.

Figure 3:
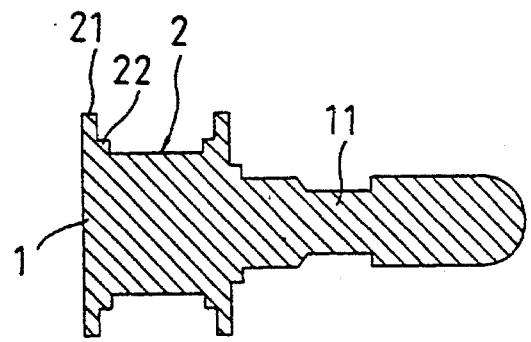
FIG. 3 is a sectional view taken along line 3—3 of FIG. 1.

Referring to FIG. 3, the universal wiper arm connector is a integral member preferably made of reinforced plastic thereby making it unnecessary to fit the axle 11 in the U-shaped body 1 and extending the service life thereof.

Figure 4:
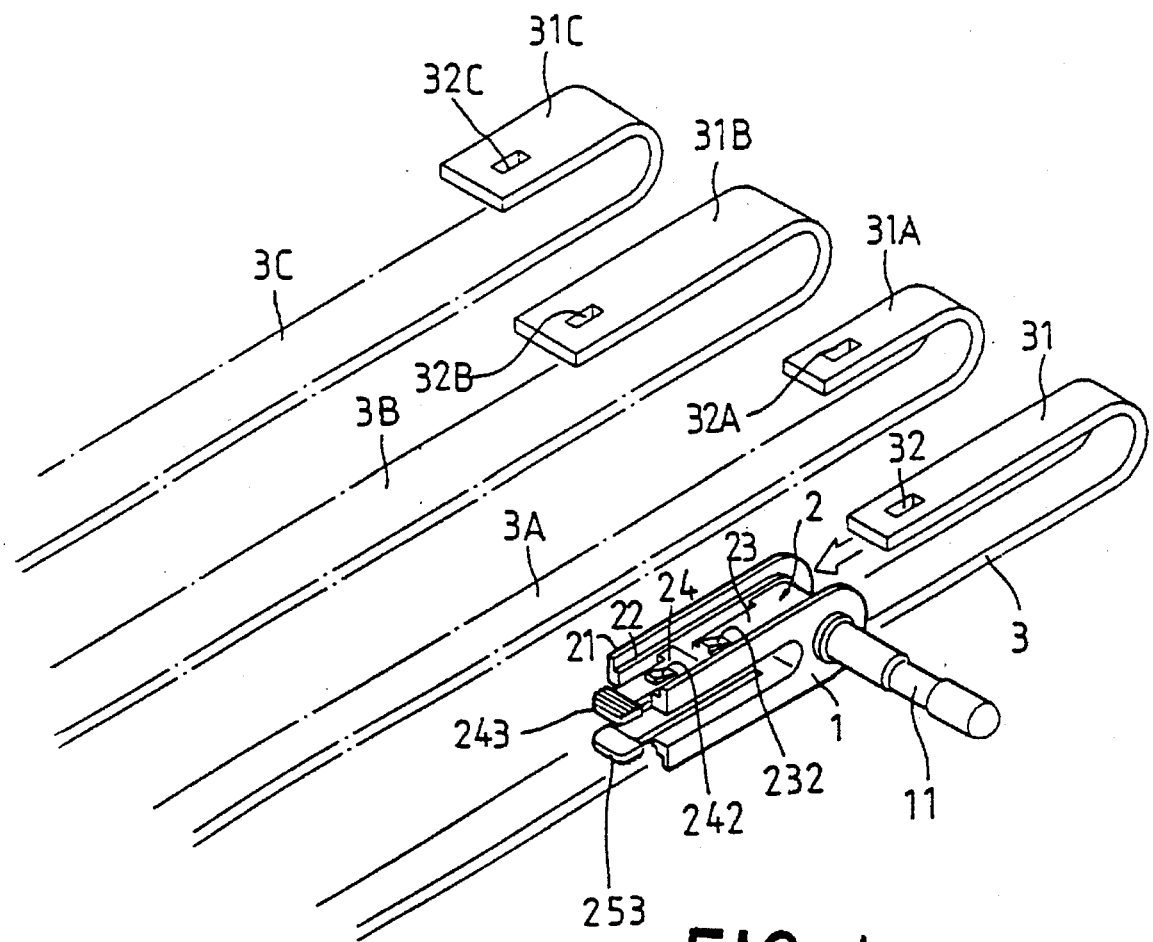
FIG. 4 illustrates how to engage the present invention with wiper arms of different sizes.

As shown in FIG. 4, the present invention can be easily connected with holes 32, 32A, 32B and 32C of the U-shaped ends 31, 31A, 31B and 31C of the wiper arms 3, 3A, 3B and 3C without any difficulty.

Figure 5:
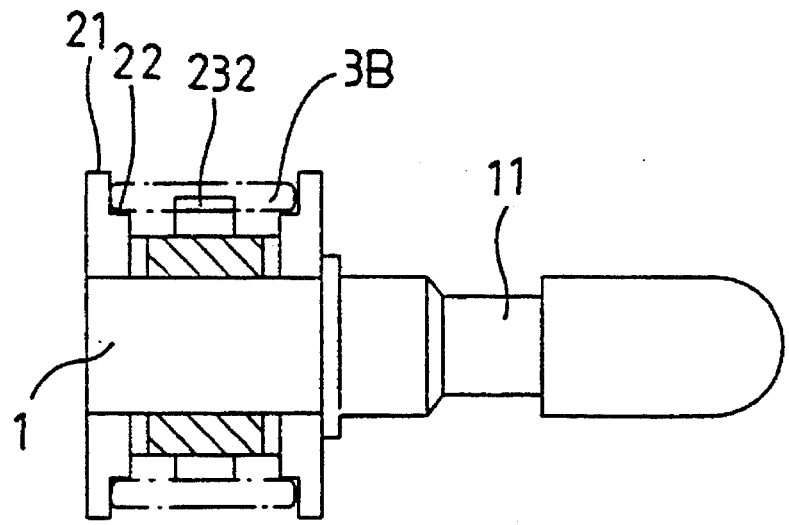
FIG. 5 illustrates how to engage the present invention with a narrower wiper arm.
Figure 6:
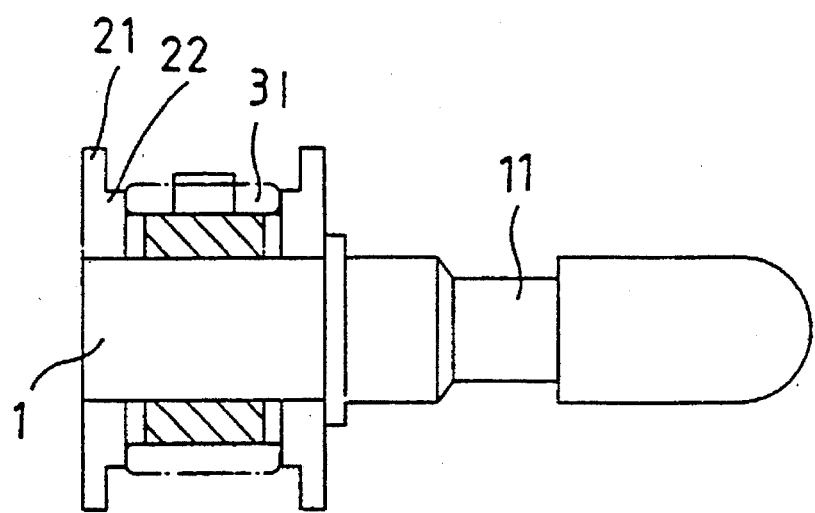
FIG. 6 illustrates how to engage the present invention with a wider wiper arm.

The wider wiper arm 3B is disposed between the two flanges 21 of the present invention (see FIG. 5), while the narrower wiper arm 31 is received between the two shouders 22 of the present invention (see FIG. 6).

Figure 7:
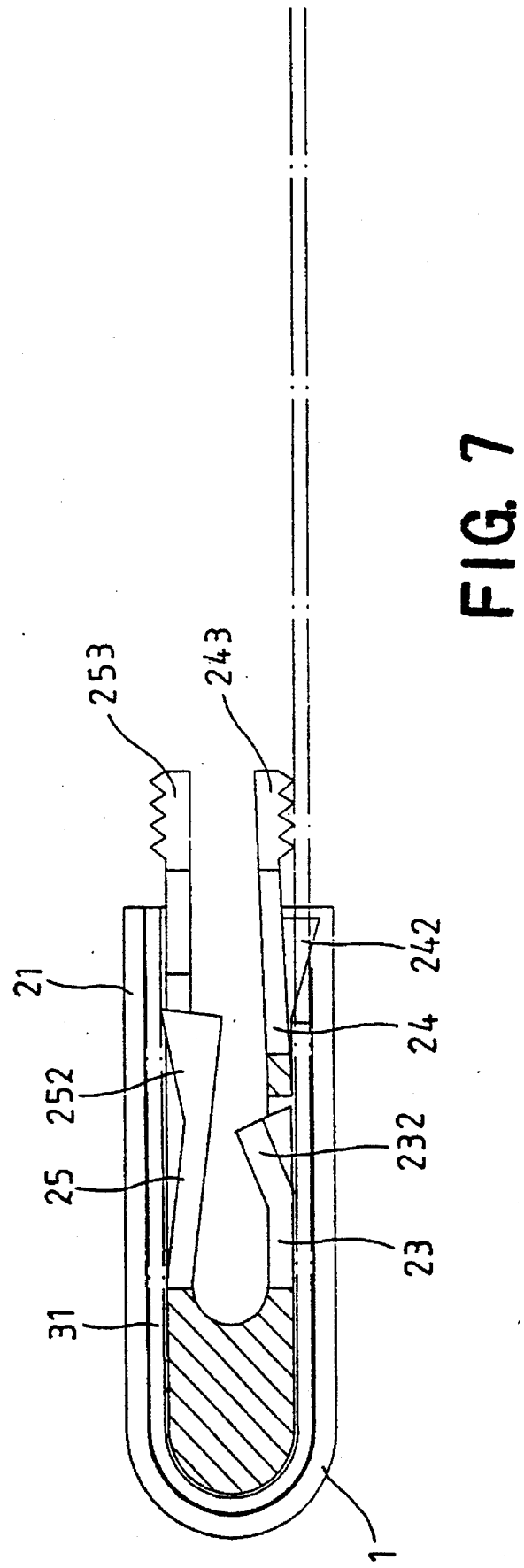
FIG. 7 shows the working principle of the present invention.

FIG. 7 illustrates the working principle of the present invention. As illustrated, when required to engage the present invention with a wiper arm, it is only necessary to slide the present invention into the U-shaped end of the wiper arm causing one of its wedge-like protuberances 232, 242 and 252 to engage with the hole of the U-shaped end of the wiper arm. When desired to disengage the present invention from the wiper arm, it is only necessary to press the handles 243 and 253.

The invention is naturally not limited in any sense to the particular features specified in the forgoing or to the details of the particular embodiment which has been chosen in order to illustrate the invention. Consideration can be given to all kinds of variants of the particular embodiment which has been described by way of example and of its constituent elements without thereby departing from the scope of the invention. This invention accordingly includes all the means constituting technical equivalents of the means described as well as their combinations.

I claim:

1. A universal wiper arm connector for connecting a windshield wiper with a wiper arm, said connector comprising:

an elongated, U-shaped body defining transversely spaced sides, said U-shaped body having an upper arm and a lower arm, said upper and lower arms each formed with a pair of flanges, one on each side of said body, said flanges being each formed with a shoulder at an inner side thereof, said upper arm is provided with a first tongue and a second tongue cantilevered thereto, said first and second tongues lying between the shoulders of said upper arm, said first and second tongues lying in a common plane and defining an upper side which is located lower than the shoulders of said upper arm, said first tongue having a free end separated by a first groove from a cantilevered end of said second tongue and a pair of second grooves along both sides of a front portion thereof which has a first wedge-shaped protuberance thereon, said second tongue having a pair of third grooves along both sides of a front portion thereof which has a second wedge-shaped protuberance thereon, said lower arm being provided with a third tongue cantilevered thereto, said third tongue having a bottom side higher than the shoulders of said lower arm, said third tongue having a front portion which has a pair of fourth grooves along both sides thereof and a third wedge-shaped protuberance thereon;

an axle extending from said U-shaped body, perpendicular thereto.

2. The universal wiper arm connector as claimed in claim 1, wherein said second and third tongues are each provided with a handle at the free end thereof.

3. The universal wiper arm connector as claimed in claim 1, wherein said axle is of one piece with said U-shaped body.

* * * * *